United States Patent
Herget et al.

(10) Patent No.: US 11,945,501 B2
(45) Date of Patent: Apr. 2, 2024

(54) METHOD FOR OPERATING A LANE GUIDANCE SYSTEM AND LANE GUIDANCE SYSTEM

(71) Applicant: DAIMLER AG, Stuttgart (DE)

(72) Inventors: Constantin Herget, Stuttgart (DE); Markus Dick, Weil der Stadt (DE); Ralph Klingel, Wimsheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 336 days.

(21) Appl. No.: 17/424,544

(22) PCT Filed: Jan. 16, 2020

(86) PCT No.: PCT/EP2020/051068
§ 371 (c)(1),
(2) Date: Jul. 21, 2021

(87) PCT Pub. No.: WO2020/152030
PCT Pub. Date: Jul. 30, 2020

(65) Prior Publication Data
US 2022/0073138 A1    Mar. 10, 2022

(30) Foreign Application Priority Data
Jan. 22, 2019 (DE) .......................... 10 2019 000 461

(51) Int. Cl.
*B62D 15/02* (2006.01)
*B60W 30/12* (2020.01)
(Continued)

(52) U.S. Cl.
CPC ........... *B62D 15/025* (2013.01); *B60W 30/12* (2013.01); *B60W 60/005* (2020.02); *B62D 15/029* (2013.01); *B60W 2050/0215* (2013.01)

(58) Field of Classification Search
CPC .... B62D 15/025; B62D 15/029; B62D 1/046; B62D 15/0255; B60W 30/12;
(Continued)

(56) References Cited

U.S. PATENT DOCUMENTS 9,475,521 B1   10/2016   Fung et al.
10,974,736 B2   4/2021   Odate et al.
(Continued)

FOREIGN PATENT DOCUMENTS

CN    104728014 A    6/2015
CN    106462027 A    2/2017
(Continued)

OTHER PUBLICATIONS

International Search Report dated Apr. 20, 2020 in related/corresponding International Application No. PCT/ EP2020/051068.
(Continued)

*Primary Examiner* — Dale Moyer
*Assistant Examiner* — Tanner L Cullen
(74) *Attorney, Agent, or Firm* — PATENT PORTFOLIO BUILDERS PLLC

(57) ABSTRACT

A method for operating a lane guidance system involves determining a time period from the time of a request from the lane guidance system to a vehicle user to touch the steering handle until the occurrence of a sensor signal caused by a touch of the steering handle in the sensor region and comparing it with a predetermined time window. An activation option of the lane guidance system is blocked in the event that the determined time duration is greater than the predetermined time window. In the event of a first request to touch the steering handle after an idle state, an activation option of the lane guidance system is disabled until a subsequent idle state.

10 Claims, 3 Drawing Sheets

Figure 1:
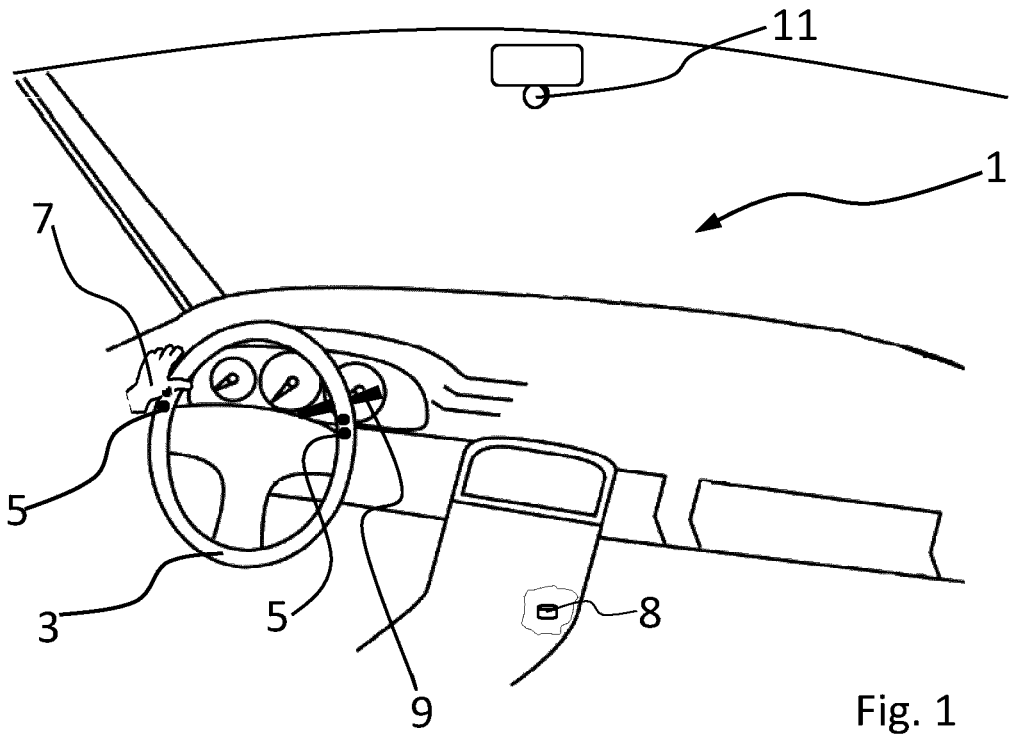

(51) Int. Cl.
*B60W 60/00* (2020.01)
*B60W 50/02* (2012.01)
*B60W 50/029* (2012.01)
*B60W 50/14* (2020.01)
*B60W 50/16* (2020.01)

(58) Field of Classification Search
CPC .......... B60W 60/005; B60W 60/0051; B60W 60/0053; B60W 60/0059; B60W 2050/0215; B60W 2050/0295; G08G 1/167; B60T 2201/08; B60T 2201/085; B60Y 2300/12
See application file for complete search history.

(56) References Cited

U.S. PATENT DOCUMENTS

| | | | |
|---|---|---|---|
| 2010/0185341 A1 | 7/2010 | Wilson et al. | |
| 2015/0259008 A1* | 9/2015 | Seguchi | B62D 15/025 701/41 |
| 2016/0244056 A1* | 8/2016 | Seguchi | B60W 30/12 |
| 2017/0088175 A1* | 3/2017 | Okuda | B62D 15/025 |
| 2018/0037224 A1* | 2/2018 | Bogner | B60W 10/18 |
| 2018/0345964 A1 | 12/2018 | Fujii et al. | |
| 2020/0298881 A1* | 9/2020 | Odate | B60W 60/0015 |

FOREIGN PATENT DOCUMENTS

| | | |
|---|---|---|
| DE | 102010022433 A1 | 12/2011 |
| DE | 102013009423 A1 | 12/2014 |
| WO | 2017168540 A1 | 10/2017 |
| WO | 2018011872 A1 | 1/2018 |

OTHER PUBLICATIONS

Office Action dated Sep. 12, 2019 in related/corresponding DE Application No. 10 2019 000 461.2.
Written Opinion dated Apr. 20, 2020 in related/corresponding International Application No. PCT/EP2020/051068.
Office Action dated Oct. 27, 2023 in related/corresponding CN Application No. 202080009767.4.

* cited by examiner

METHOD FOR OPERATING A LANE GUIDANCE SYSTEM AND LANE GUIDANCE SYSTEM

BACKGROUND AND SUMMARY OF THE INVENTION

Exemplary embodiments of the present invention relate to a method for operating a lane guidance system and an associated lane guidance system of a vehicle.

Modern motor vehicles have lane guidance systems set up for autonomous steering of a vehicle, wherein in many driving situations, the readiness of a user to take over vehicle control on a steering handle is required. If, in the case of an active lane guidance system, user contact with the steering handle cannot be detected within a predetermined time window, the lane guidance system is deactivated and reactivated when contact is made.

U.S. 2010/0185341 A1 discloses using a sensor arranged in the steering wheel to determine a degree of readiness of a user at the steering wheel by detecting a touch.

DE 10 2010 022 433 A1 discloses a method in which it is indicated to the driver to take over control of the vehicle. If no driver takeover is detected, the automatic assistance system is switched off at the same time as the hazard warning lights are activated.

If a sensor is defective, it does not emit any sensor signal, and the absence of the sensor signal is interpreted as a lack of readiness of the vehicle user to control the vehicle.

Accordingly, the exemplary embodiments of the present invention are directed to a method for operating a lane guidance system and a lane guidance system, which enable safer operation of the lane guidance system.

In the method according to the invention for operating a lane guidance system having a steering handle comprising a touch-sensitive sensor, the following steps are carried out:
- determining a time period from the time of a request from the lane guidance system to a vehicle user to touch the steering handle until the occurrence of a sensor signal caused by a touch of the steering handle in the sensor region and comparing it with a predetermined time window,
- blocking an activation option of the lane guidance system in the event that the specified time period is greater than the specified time window, wherein the lane guidance system is disabled upon a first request to touch the steering handle after an idle state until a subsequent idle state.

The lane guidance system is set up to steer independently; for this purpose the lane guidance system according to the prior art comprises, for example, environmental sensors such as a camera, radar, lidar for detecting the environment and the course of the road, a computing unit for data evaluation and actuators for controlling the steering system. Preferably, the lane guidance system is coupled to a longitudinal control system, such that an autonomous or semi-autonomous driving operation can be implemented. Depending on the automation level of the driving operation, the user must, for example, take over the steering task or the driving task comprising longitudinal and lateral control after a predetermined period of time or before or when a system limit is reached. The system limit specifies until when autonomous or semi-autonomous driving is possible. By way of example, autonomous or semi-autonomous driving is no longer possible if there are no lines to mark the edge of the road, if there is heavy precipitation or if there is complex traffic routing in construction zones.

When the steering handle is grasped, a sensor detects that the user is taking over the steering of the vehicle. If it is detected that the driver is not taking over the steering task, it must be assumed that the driver's health is impaired and an emergency stop of the vehicle must preferably be initiated. If the sensor is defective or if the user drives with gloves, in a takeover situation from an autonomous driving mode, a grasping of the steering handle by the user cannot be detected, such that the emergency stop would be carried out unwantedly. For the purposes of the application, the term sensor is understood to mean not only the sensor itself, but also the associated components for transmitting and evaluating a sensor signal, i.e., the cabling, the evaluation unit etc. The method according to the invention avoids this emergency stop, which is superfluous in this situation, by an initialization, i.e., a check of the sensor's operability, being carried out immediately after the vehicle has come to a standstill, and the lane guidance system can be activated only after the sensor's operability has been confirmed. At the same time, a correctly operating sensor unit for detecting the driver's contact is guaranteed.

By way of example, the lane guidance system is ready for operation in the sense of the present application as soon as the user has requested the lane guidance system by switching it on and all conditions for the function of the lane guidance system have been met; the readiness for operation is indicated by a symbol such as a steering wheel icon, for example. The conditions for a function of the lane guidance system require, for example, that the environment sensor system reliably detect road boundaries, that the vehicle is driving in a permissible speed range or that the steering actuators are functional.

In case the determined time period from the time of requesting a vehicle user to touch the steering handle until the detection of the sensor signal caused by the touch is greater than the predetermined time window, there is no activation possibility of the lane guidance system until the next idle state or until a wake-up from the idle state. The idle state of the lane guidance system is accompanied by an idle state of the vehicle; in the case of internal combustion vehicles, the idle state is reached by termination of an ignition run, i.e., the idle state is reached after switching off terminal 15, preferably including overrun. In electric vehicles, the idle state would be characterized, for example, by switching off or by control units of at least the drive system and/or the on-board power supply system being put into a sleep mode analogously to switching off terminal 15. The lane guidance system remains switched off or an activation option is blocked until the next idle state and is no longer available until then; the user receives information about a system defect. Due to the method, it is advantageously avoided that, when the system is ready for operation, i.e., the lane guidance system has been requested by the user and conditions for operation have been fulfilled, an emergency stop is initiated in the absence of a sensor signal, for example due to a defect, and an associated lack of safety of the user is triggered.

According to one embodiment, in the event that the specific time period from the time of the request to a vehicle user to touch the steering handle until the detection of the sensor signal caused by the touch is less than the predetermined time window, i.e., the occurrence of the sensor signal is detected within the predetermined time window, an enablement of an activation of the lane guidance system occurs. In other words, the initialization of the sensors is successful in that case. With the successful initialization, the lane guidance system is activated as soon as it is ready for operation. The activated lane guidance system steers independently; the function is represented by a green steering wheel icon, for example. Once the activation of the lane guidance system has been enabled, the function of the sensors is proven and the lane guidance system can thus be reactivated at any time after deactivation. If the lane guidance system is deactivated, for example, due to conditions not being met, then it can be activated at any time as soon as the conditions are met again. If the lane guidance system is deactivated due to missing lane markings, for example, a user can reactivate the lane guidance system by requesting it as soon as the lane markings are present again.

According to a further embodiment of the invention, the request to touch the steering handle occurs when the lane guidance system is ready for operation. As soon as the lane guidance system is ready for operation, i.e., all conditions for the function of the lane guidance system are fulfilled and the user has requested the system function, the request to touch the steering handle occurs. Initialization thus takes place as soon as the user wants to drive for the first time with the support of the lane guidance system after the vehicle has been in an idle state. In an advantageous manner, the checking of the sensors only takes place when the user requests the support of the lane guidance system.

According to one design of the present invention, a vehicle user is visually, audibly, and/or haptically prompted to touch the steering handle in the sensor region. In other words, the user is prompted to carry out a check of the sensor function after each idle state of the vehicle, thereby avoiding unnecessary emergency stop maneuvers.

According to a further design of the present invention, in the absence of a touch after a predetermined period of time following a request to touch the steering handle, the vehicle user is again requested visually, audibly, and/or haptically, preferably with increased intensity, to touch the steering handle in the sensor region. The renewed request before blocking the activation option draws the user's attention more strongly to the display and motivates the user to touch the sensor, such that the time period from the time of a request from the lane guidance system to the occurrence of a sensor signal caused by a touch of the steering handle in the sensor region is shorter than the specified time window.

According to a further embodiment, touching the steering handle comprises approaching a control element and subsequently touching the steering wheel. According to this embodiment, only a sensor signal caused by touching a sensor not previously touched is recognized as valid. As an actuation, only a signal caused by an approaching hand with subsequent touch is recognized as a valid signal, for example a sensor signal starting with a positive edge. In an advantageous manner, it is prevented that a sensor signal caused by removal of a hand from the steering wheel leads to activation of the lane guidance system.

According to a further embodiment of the present invention, the vehicle user is informed about the blocking of the activation possibility of the lane guidance system until the following idle state by means of a visual, audible and/or haptic display; preferably the user is informed about a possible technical defect of the sensor.

The device according to the invention comprises a lane guidance system having a touch-sensitive sensor arranged on a steering handle, a computing unit that determines a time period from a request of the lane guidance system to a vehicle user to touch the steering handle until the occurrence of the sensor signal caused by a touch and compares it with a predetermined time window, wherein the computing unit blocks an activation option of the lane guidance system in the event that the determined time duration is greater than the predetermined time window, wherein the activation option of the lane guidance system remains blocked in the event of an initial request to touch the steering handle after an idle state until a subsequent idle state of the vehicle. In an advantageous manner, the lane guidance system avoids that the initiation of an emergency stop maneuver is avoided in the absence of a sensor signal after a request to a user, for example due to a sensor defect or operation with gloves.

According to a further design of the present invention, the sensor is designed as a capacitive, inductive, resistive or optical sensor. The sensors enable reliable detection of a touch by a hand.

The present invention is explained in more detail below by means of exemplary embodiments with reference to the accompanying drawing, in which the same or similar parts are designated with the same reference numerals.

BRIEF DESCRIPTION OF THE DRAWING FIGURES

Figure 2:
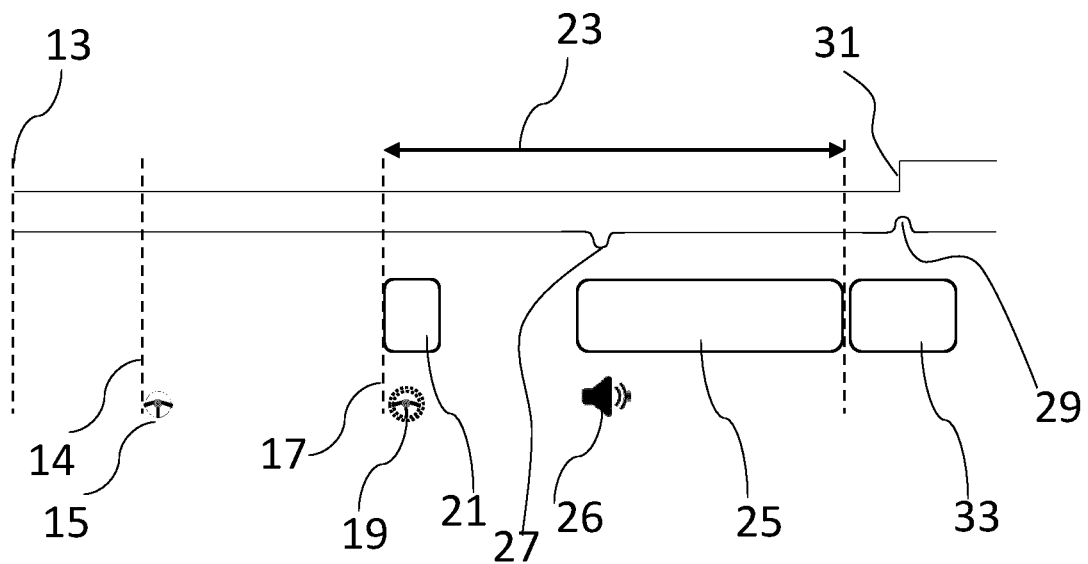
Figure 3:
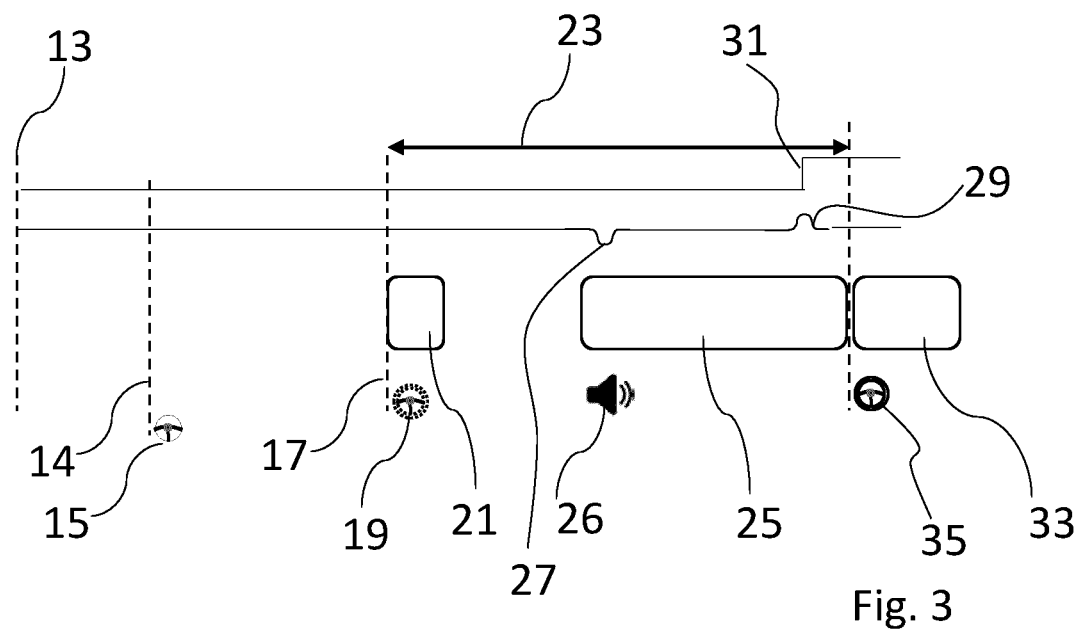
Figure 4:
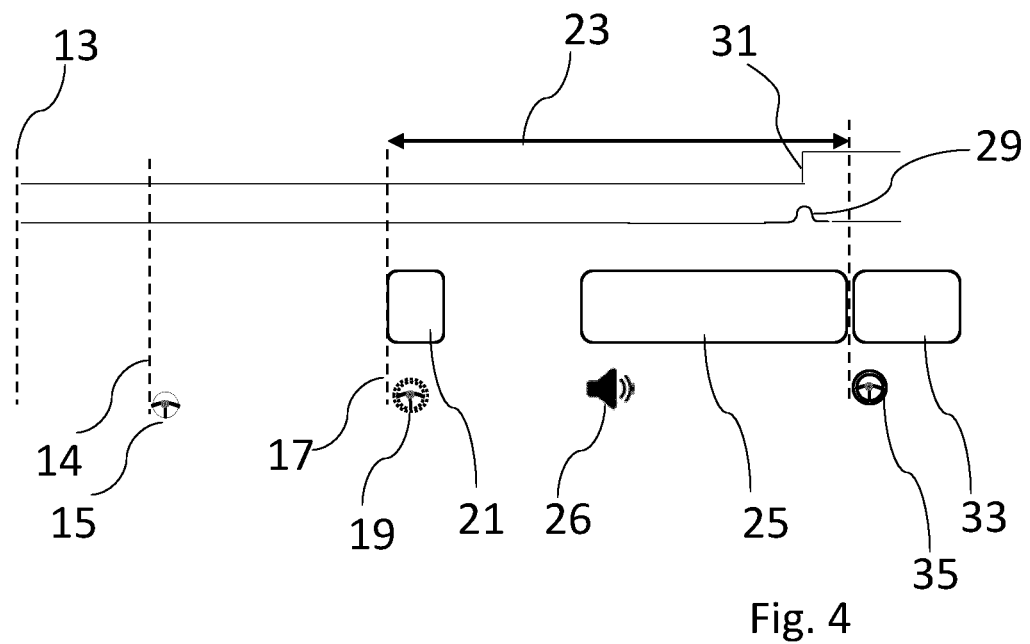
Figure 5:
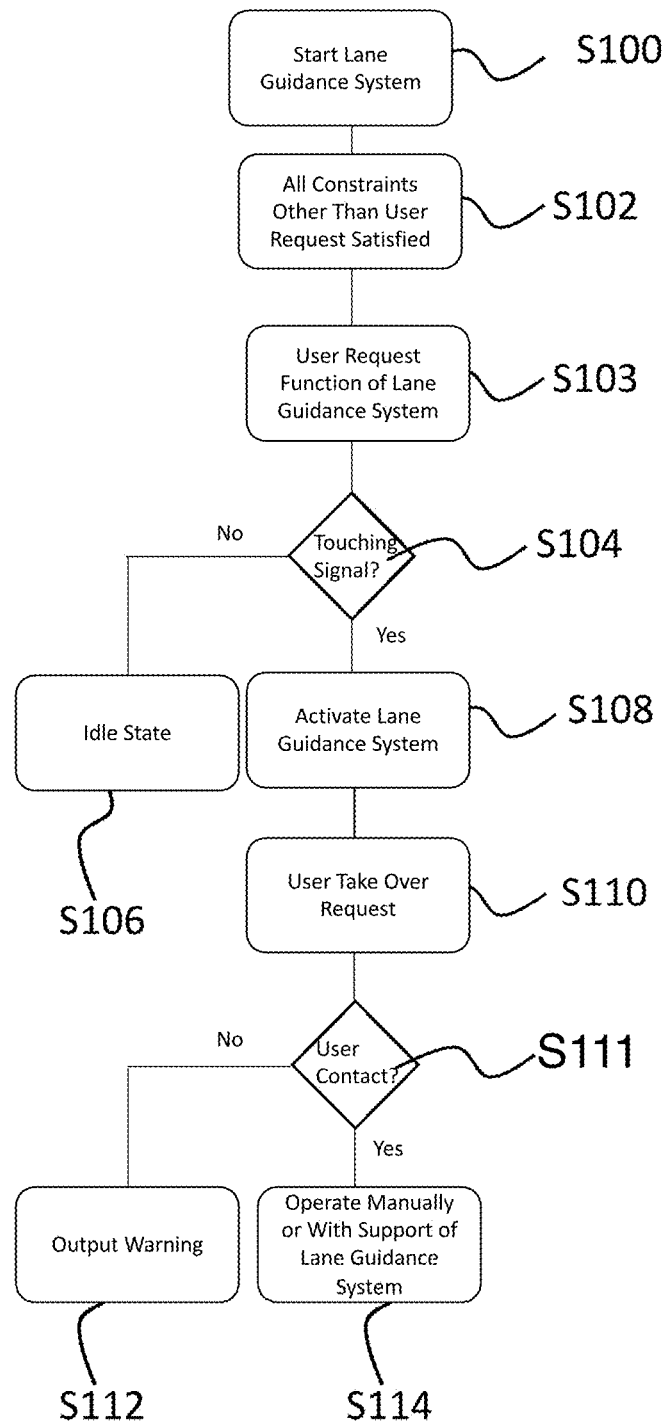

Here are shown:

FIG. 1 a schematic view of a vehicle interior;

FIG. 2 a representation of a functional sequence of the method according to the invention;

FIG. 3 a further representation of a functional sequence of the method according to the invention;

FIG. 4 a further representation of a functional sequence of the method according to the invention; and FIG. 5 a flow diagram of the method according to the invention.

DETAILED DESCRIPTION

Before the exemplary embodiments of the present invention are described in detail, a structure used in all the exemplary embodiments of the present invention explained below will be described.

In FIG. 1, a vehicle interior 1 associated with a vehicle having a lane guidance system is shown. The lane guidance system comprises a steering handle designed as a steering wheel 3 with sensors 5 arranged on both sides for determining a user contact caused by, for example, a hand 7. The lane guidance system can be switched on by means of a lever 9. Switching on means, in other words, that an automatic steering function is requested; the actual activation of automatic steering optionally only takes place when further conditions are fulfilled. As soon as the lane guidance system, i.e., the automatic steering function, is activated, the vehicle follows the course of the road detected by a camera 11 in an automated manner, i.e., without further steering intervention by the user. If the camera 11 can no longer reliably determine the course of the lane, for example in a construction site, then the user is prompted to take over the steering task. When the steering wheel 3 is gripped by the hand 7, the sensors 5, i.e., at least one of the sensors 5, detect that the vehicle user has taken over the driving task.

FIG. 2 shows an embodiment of a functional sequence for activating a lane guidance system after a start from an idle state 13, i.e., after a vehicle start from the idle state 13. When the vehicle is started up, all control units are woken up, i.e., a computing unit 8 or a control device of the lane guidance system is started up. The start-up is performed by switching on the ignition or an equivalent action. After start-up, the vehicle drives off and indicates with the symbol 15 at the time 14 that the lane guidance system is available. The conditions for automatic steering are now fulfilled, for example the camera 11 can detect the road course, the speed is within a predetermined range etc., such that automatic steering is possible in principle.

At the point in time 17, the conditions for automatic steering are still fulfilled; furthermore the user has now switched on or requested the lane guidance system; a symbol 19 indicates operational readiness. With a first graphic display 21, the user is requested to take hold of the steering wheel 3 in the region of the sensors 5. In the case of the sensors 5 that merely detected a change in state by means of a signal peak, gripping is to be understood as an approach with subsequent sensor contact. If the steering wheel is already held in the sensor region and thus already touched, then a hand's movement away and a subsequent movement towards with a renewed touching of a sensor 5 is required.

In the time window 23, it is monitored whether or not such a touch, i.e., the towards movement of the hand 7 with subsequent touch, occurs. The time window 23 defines a period of time starting from the time of operational readiness 17. If the touch does not occur after a predetermined time after the point in time 17, a second graphic display 25 accompanied by an acoustic indication 26 is displayed after the first graphic display disappears. In the present example according to FIG. 2, the user takes his/her hand away from the sensor region, whereupon the sensor 5 emits the signal 27 beginning with a negative edge. Contact with the sensor 5 after the hand has approached the steering wheel does not occur until outside the time window 23. Outside the time window 23, the sensor 5 transmits a signal with a positive edge 29 and a trigger signal 31 is sent to the computing unit 8 of the lane guidance system. The time duration from the occurrence of the operational readiness 17 to the occurrence of the sensor signal 29 or the trigger signal 31 is determined and compared with the time window 23. Since the time duration is greater than the time window 23, an activation of the lane guidance system is blocked until the next idle state, i.e., the lane guidance system remains deactivated even if the conditions for automatic steering are fulfilled and the user requests the system function. The user is informed of the blocked activation of the lane guidance system with a message 33.

In the application case according to FIG. 3, in contrast to FIG. 2, a touch of the sensor 5 occurs after the hand approaches the steering wheel within the time window 23, the sensor 5 sends a signal with a positive edge 29 and a trigger signal 31 is sent to the computing unit 8 of the lane guidance system within the time window 23, whereupon the lane guidance system is activated. The user is informed about the activated lane guidance system by a message 33. The symbol 35 indicates to the user that the lane guidance system steers automatically.

In a further application according to FIG. 4, contact with the sensor 5 occurs after the hand approaches the steering wheel within the time window 23 without first removing the hand from the sensor 5. This case occurs, for example, when the user first holds the steering wheel 3 outside the sensor region and touches a sensor 5 within the time window 23. The sensor 5 sends a signal with a positive edge 29, and a trigger signal 31 is sent to the computing unit 8 of the lane guidance system within the time window 23, whereupon the lane guidance system is activated as described in FIG. 3.

In the preceding examples, the sensor 5 only detects a signal peak caused by a change such as a touch or termination of a touch.

In another embodiment not depicted, the sensor 5 can detect at any time whether a hand contact signal is present or not. For example, if the hand is already in contact with a sensor 5 before the point in time 17, the user does not need to lift and replace a present hand in the time window 23 to confirm the operation of the sensor 5.

The operating procedure shown in FIG. 5 starts in step S100 with a start of the lane guidance system, which is associated with a change of the vehicle state from an idle state to a ready-to-drive state. Ready to drive means that the driver only has to engage a gear and/or to press the accelerator pedal to drive.

In step S102, it is recognized that all constraints for automatic steering are satisfied except for a user request.

In step S103, it is recognized that the user has requested a function of the lane guidance system; the lane guidance system is thus ready for operation. Upon reaching operational readiness, a request is issued to the vehicle user to touch the steering handle 3 in the region of the sensors. In step S104, it is monitored whether or not a signal caused by touching the sensors occurs within the time window 23 from the time of the request for operational readiness.

If no sensor signal occurs, then the function of the lane guidance system is disabled until a new start according to S100 after an idle state in step S106 and the user is informed. In this case, it is assumed that the sensor 5 or the components connected to the sensor for transmission to the computing unit 8 of the lane guidance system are defective.

If a sensor signal is detected in step S104, then the lane guidance system is activated in step S108.

If the constraints for automatic steering are no longer complied with in step S110, the user is requested to take over the vehicle guidance. The takeover is again to be confirmed by detecting contact with one of the sensors 5 on the steering wheel 3.

If a check in step S111 shows that no contact has occurred within a further time window after the takeover request, an emergency stop of the vehicle is initiated in step S112 or a corresponding warning message is output. Since the function of the sensor is confirmed in step S104, for example, only an inability of the user to take over the vehicle can be the cause in the absence of the sensor signal in step S110. If contact is detected in the further time window, the user can continue to drive the vehicle manually or with the support of the lane guidance system, depending on the operating state according to step S114.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a vehicle lane guidance system having a steering handle comprising a touch-sensitive sensor, the method comprising:

determining a time period from a time of a request from the lane guidance system to a vehicle user to touch the steering handle until occurrence of a sensor signal caused by a touch of the steering handle in a region of the touch-sensitive sensor and comparing the determined time period with a predetermined time window;

blocking, responsive to the determined time period being greater than the predetermined time window, an activation option of the lane guidance system responsive to a first request to touch the steering handle after an idle state, wherein the activation option is disabled until a subsequent idle state and the lane guidance system is no longer available until the subsequent idle state.

2. The method of claim 1, further comprising:
enabling the activation option of the lane guidance system takes responsive to the determined period of time being less than the predetermined time window.

3. The method of claim 1, wherein the request from the lane guidance system to a vehicle user to touch the steering handle occurs with an occurrence of an operational readiness of the lane guidance system.

4. The method of claim 1, wherein the request from the lane guidance system to a vehicle user to touch the steering handle is a visual, audible, or haptic prompt.

5. The method of claim 4, wherein in absence of contact after a predetermined period of time after the request from the lane guidance system to a vehicle user to touch the steering handle, the vehicle user is again prompted visually or audibly to touch the steering handle in the region of the touch-sensitive sensor.

6. The method of claim 1, wherein the touching of the steering handle includes an approach to a control element and a subsequent touching of the steering wheel.

7. The method of claim 1, wherein the vehicle user is informed about the blocking of the activation option of the lane guidance system until the subsequent idle state by a graphic or acoustic display.

8. A lane guidance system, comprising:
a touch-sensitive sensor arranged on a steering handle; and
a computing unit configured to determine a time period from a request from the lane guidance system to a vehicle user to touch the steering handle until occurrence of a sensor signal caused by a touch of the steering handle and compares the determined time period with a predetermined time window, and block responsive to the determined time period being greater than the predetermined time window, an activation option of the lane guidance system responsive to a first request to touch the steering handle after an idle state, wherein the activation option is disabled until a subsequent idle state and the lane guidance system is no longer available until the subsequent idle state.

9. The lane guidance system of claim 8, wherein the touch-sensitive sensor is a capacitive, inductive, resistive, or optical sensor.

10. A method, comprising:
starting a lane guidance system of a vehicle;
determining that all constraints for the lane guidance system are satisfied other than a user request to activate the lane guidance system;
receiving a user request to activate the lane guidance system;
outputting, responsive to receiving the user request, a request for the user to touch a steering handle of the vehicle;
determining a time period from a time of the request for the user to touch the steering handle until a touch from the user on the steering handle is detected;
comparing the determined time period with a predetermined time window; and
blocking, responsive to the determined time period being greater than the predetermined time window, an activation option of the lane guidance system responsive to a first request to touch the steering handle after an idle state of the vehicle,
wherein the activation option is blocked until, and the lane guidance system is no longer available until, a subsequent idle state of the vehicle.

* * * * *